US006242520B1

(12) United States Patent
Venkataramani et al.

(10) Patent No.: US 6,242,520 B1
(45) Date of Patent: Jun. 5, 2001

(54) FLAME RETARDANT POLYMER COMPOSITIONS WITH COATED BORON PHOSPHATE

(75) Inventors: Venkat Subramaniam Venkataramani, Clifton Park, NY (US); Jeremy Paul Shaw, Halsteren (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 08/800,689

(22) Filed: Mar. 13, 1997

Related U.S. Application Data

(63) Continuation of application No. 08/558,562, filed on Nov. 1, 1995, now abandoned.

(51) Int. Cl.[7] .......... C08K 3/38

(52) U.S. Cl. .......... 524/404; 523/210; 524/405; 524/417; 524/424; 524/430; 524/437

(58) Field of Search .......... 523/210; 524/424, 524/430, 437, 405, 417, 404

(56) References Cited

U.S. PATENT DOCUMENTS 3,650,783 * 3/1972 Yates .......... 106/69
4,079,022 3/1978 Ferrarini, Jr. et al. .......... 260/2.5 FP
4,863,992 9/1989 Wengrovius et al. .
5,043,369 * 8/1991 Bahn et al. .......... 523/466
5,156,775 10/1992 Blount .......... 252/609
5,714,550 * 2/1998 Shaw .

FOREIGN PATENT DOCUMENTS 369169 5/1990 (EP) .

OTHER PUBLICATIONS

European Search Report.

* cited by examiner

*Primary Examiner*—Robert Dawson
*Assistant Examiner*—Marc S. Zimmer
(74) *Attorney, Agent, or Firm*—Noreen C. Johnson; Douglas E. Stoner

(57) ABSTRACT

Polymer compositions comprising polysiloxanes and metal coated boron phosphates are described and they unexpectedly display flame retardant properties and hydrolytic stability without creating environmental hazards.

12 Claims, No Drawings

FLAME RETARDANT POLYMER COMPOSITIONS WITH COATED BORON PHOSPHATE

This application is a Continuation of application Ser. No. 08/558,562 filed Nov. 1, 1995, now abandoned.

FIELD OF THE INVENTION

The instant invention is directed to polymer compositions. The polymer compositions comprise coated boron phosphate compositions and they unexpectedly display flame retardant properties without creating environmental hazards.

BACKGROUND OF THE INVENTION

Compositions which comprise polyphenylene sulfides, polyamides and/or polyphenylene ethers (PPE), for instance, constitute an invaluable class of engineering materials. Materials of such are characterized by a unique combination of chemical, physical and electrical properties. For instance, they are resistant to many solvents and generally have high impact strengths. As a result of this unique combination of properties, polyphenylene ethers, polyphenylene sulfides and polyamide materials are suitable for a broad range of commercial applications.

Moreover, as a result of said properties, and particularly their characteristic dimensional stability and dielectric properties, it has been of increasing interest to prepare materials of the above-described which also display flame retardant properties. The flame retardant properties are typically obtained by employing additives such as halogenated compounds, antimony containing compounds and/or red phosphorus which invariably create severe environmental hazards. Moreover, attempts have been made to use salt additives; however, their hydrolytic instability proved them to be ineffective.

This invention, however, is directed to polymer compositions which comprise coated boron phosphate compositions and they unexpectedly display hydrolytic stability and flame retardant properties without creating environmental hazards.

DESCRIPTION OF THE PRIOR ART

Efforts have been disclosed for producing polymer compositions. In U.S. Pat. No. 5,043,369, glass/glass-ceramic-plastic alloy articles are described.

Other attempts have been made to prepare polymer compositions. In U.S. Pat. No. 4,544,695, polymeric flame retardant compositions comprising phosphate-sulfate glass compositions are described.

Still other investigators have focused on the production of polymer compositions. In U.S. Pat. No 4,079,022, fire retardant resin compositions containing moisture resistant low melting phosphate glass is described.

SUMMARY OF THE INVENTION

The instant invention is directed to a composition comprising:

(a) an additive comprising a core and a metal compound coating wherein said core comprises boron phosphate and said metal ion coating comprises at least one metal selected from the members consisting of Group IIA, IIB, IIIB, IVB, VIIB and VII metals;

(b) polysiloxanes; and (c) a polymer system selected from the group consisting of immiscible polymer blends, miscible polymer blends, copolymers, thermoplastic polymers and thermosetting polymers.

The Group IIA, IIB, IIIB, IVB, VIIB and VII metals are according to the CAS version of the Periodic Table of the Elements as set forth in the *Handbook of Chemistry and Physics,* 93rd Edition, 1992–1993.

DETAILED DESCRIPTION OF THE PREFERRED EMBODIMENTS

The boron phosphate core of the additive employed in this invention is often commercially available. Additionally, it may be prepared by mixing, for example, hydrated boric acid and phosphoric acid followed by heating the resulting mixture to a calcining temperature.

The coating, typically a metal borate or a metal phosphate, surrounding the boron phosphate core is prepared by first forming a boron phosphate slurry and adding to the slurry a salt of the metals described in (a). The salts are often added in the form of carboxylate, carbonate, halide, oxide, hydroxide or alkoxide; however, any form of salt capable of resulting in a metal ion coating may be employed. The salts are added to the slurry to the point where interactions are made between the metal cation of the salt and the resulting borate and phosphate ions generated in the slurry.

It is noted herein that not all of the boron phosphate ionizes. In fact, the slurry is prepared only to the extent of generating active sites on the surface of the boron phosphate core. The metal ion coating surrounding the core is not limited to any thickness. However, its thickness is typically enough to enhance the hydrolytic stability of the core without sacrificing its flame retardant properties.

The thickness of the coating, therefore, is often from about a monoatomic layer to about 1.5 microns and preferably from about a monoatomic layer to 1.0 micron thick and most preferably from about 0.02 microns to 0.15 microns. Such a coating prevents boron phosphate ionization by creating a neutralized outer layer which is insensitive to water, allowing the flame retardant properties of the hydrolytically unstable core to predominate.

Often, the preferred salts employed in this invention are those which comprise a titanium, magnesium, calcium, barium, aluminum or zinc cation.

There is essentially no limitation with respect to the polysiloxanes employed in this invention. They include polysiloxanes and siloxane copolymers such as polyphenylene ether and polyetherimide copolymers. The preferred polysiloxanes are commercially available and often represented by the formula

I

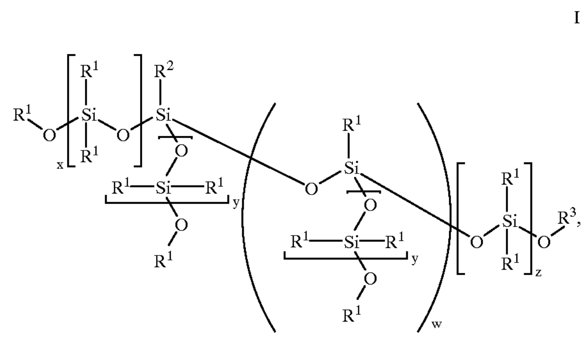

wherein each $R^1$ is independently a $C_{1-5}$ alkyl group and preferably a methyl group and $R^2$ is a $C_{1-5}$ alkyl group or a primary or secondary aminoalkyl group such as a N-(2-aminoalkyl)-3-aminoalkyl group, provided that $R^2$ is a $C_{1-5}$ alkyl group when w is 1 and a N-(2-aminoalkyl)-3- aminoalkyl group when w is 0. It is often preferred that $R^2$ is a methyl group or a N-(2-aminoethyl)-3-aminopropyl group. $R^3$ is hydrogen or a $C_{1-5}$ alkyl group, preferably a methyl group. w is 0 or 1 and x and y are each independently an integer from 1 to 7 and z is an integer from 0 to 7. It is noted herein that any combination of compounds represented by formula I may be employed.

It is also within the scope of the invention to employ polysiloxanes represented by the formulae

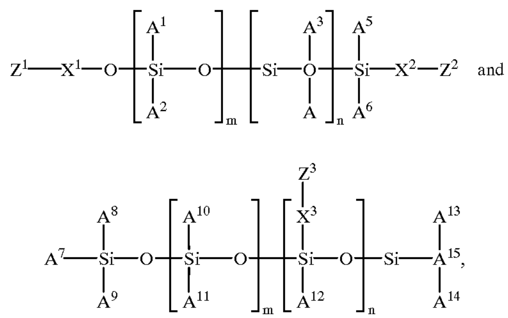

wherein m+n has a value of 5–2000, $A^1$–$A^{15}$, each independently of each other, represent a hydrogen atom or one of the following groups having 1–12 carbon atoms: alkyl, alkoxy, alkenyl, aryl, aralkyl, alkylaryl, which groups may be halogenated; wherein $X^1$, $X^2$, $X^3$, each independently of each other, represent one of the following groups: alkylene, cycloalkylene, arylene, aralkylene, alkylarylene; wherein $Z^1$, $Z^2$, $Z^3$ each represent one of the following groups: —$NA^{16}A^{17}$, —NH—$(CH_2)_q$—$NA^{16}A^{17}$ in which q has a value of 1–10 and $A^{16}$ and $A^{17}$, each independently of each other, represent a hydrogen atom or an alkyl group having 1–12 carbon atoms, an aliphatic or cycloaliphatic epoxide, a carboxylic acid or anhydride group, $Z^1$ or $Z^2$ is a hydrogen atom, in which, however, the compound of formula II may not comprise simultaneously an amine group and an epoxide group or not simultaneously an amino group and a carboxylic acid group, or not simultaneously an epoxide group and a carboxylic acid or anhydride group.

The amount of polysiloxane in the composition is not limited. It is often no more than about 20% by weight and preferably no more than about 5.0% by weight and most preferably no more than about 2.0% by weight based on total weight of the second metal composition.

There is no limitation with respect to the immiscible polymer blends, miscible polymer blends, copolymers, thermoplastic polymers or thermosetting polymers (hereinafter all referred to as polymer systems) employed in this invention other than that they are able to form a composition with the members in (a) and (b) as described above. Illustrative examples of the polymer systems that may be employed in this invention include any of those, for instance, which comprise polyphenylene ethers in combination with polyolefins, polyamides, polyarylene sulfides, polyesters, acrylonitrile butadiene styrene copolymers, polystyrenes or polyetherimides. Polycarbonates in combination with polyesters like poly(butylene terephthalate) or a terpolymer like acrylonitrile butadiene styrene may also be employed. The preferred thermoplastic polymers employed in this invention include homopolymers of polyarylene sulfides such as polyphenylene sulfide, polycarbonates, which are bisphenol A polycarbonates, polyolefins, polyamides, polyesters such as poly(ethylene terephthalate) and poly(butylene terephthalate) as well as unfunctionalized polyphenylene ether homopolymers, unfunctionalized polyphenylene ether copolymers and functionalized polyphenylene ether homopolymers and copolymers. The thermosetting polymers are not limited and often include polyurethanes and polyepoxides.

It is noted herein that any of the polymers employed in this invention, which are used to form the immiscible blends, miscible blends or copolymers, may be unfunctionalized or functionalized in the typical ways known in the art. Such functionalization is not limited and can include, for instance, functionalization with citric acid, maleic anhydride, fumaric acid, epoxides, trimellitic acid chloride anhydride, α- or β-unsaturated amides or lactams and the like provided that a polymer composition can be formed.

The polyphenylene ether portion of the polymer systems that may be employed in this invention often include both homopolymer and copolymer polyphenylene ethers. Suitable homopolymers are those which contain, for example, 2,6-dimethyl-1,4-phenylene ether units. Suitable copolymers include, for instance, graft, block or random copolymers containing such units in combination with 2,3,6-trimethyl-1,4-phenylene ether units. Such a portion is typically prepared by oxidative coupling at least one corresponding monohydroxyaromatic compound. Moreover, any of the conventional polyphenylene ether impact modifiers/additives may be employed in this invention. They include, for example, rubbery interpolymers of ethylene and α-olefins, AB (diblock) and ABA (triblock) copolymers and core-shell graft copolymers of alkenylaromatic and diene compounds, especially those comprising styrene and butadiene or isoprene blocks. Additionally, suitable lubricants such as hydrogenated poly(α-olefins) may be employed as well as talc, functionalized elastomers and reinforcing and non-reinforcing fillers.

It is often preferred that the above-described polyphenylene ether portion of the polymer systems is combined with a base polymer consisting essentially of structural units derived from olefinically unsaturated monomers including ethylene, propylene, isobutene, styrene, butadiene, isoprene, chloroprene, vinylchloride, vinyldiene chloride or combinations thereof.

The polymer systems comprising polyphenylene ethers and polyolefins may be prepared, for instance, by first reacting functionalized polyphenylene ether and polyolefins to form polyphenylene ether-polyolefin copolymers which in turn are useful as compatibilizers for polymer blends of the same. A more detailed description of such may be found in Re 34,799, the disclosure of which is incorporated herein by reference.

Other preferred polymer systems that may be employed in this invention include those comprising polyphenylene ethers and polyamides. They may be produced by any conventional method satisfactorily employed in the art. Generally, however, melt blending methods are desired. A more detailed and typical description of the production of polyphenylene ether/polyamide polymer systems that may be employed in this invention is described in U.S. Pat. No. 4,826,933, the disclosure of which is incorporated herein by reference. Additionally, it is noted herein that polyamides are intended to include toughened or super tough polyamides such as those prepared in accordance with, for instance, U.S. Pat. Nos. 4,174,358, 4,474,927, 4,346,194 and 4,251,644, herein incorporated by reference. Typical polyamides employed include polyamides 4/6, 6, 6/6, 11, 12, 6/3, 6/4, 6/10, 6/12 and nylon compounds comprising aromatic groups derived from terephthalates and isophthalates.

Still other preferred polymer systems which may be employed in this invention include those comprising polyphenylene ether and polyesters. Such polymer systems are typically prepared by melt blending polyphenylene ethers with polyesters such as poly(ethylene terephthalate), poly(butylene terephthalate), liquid crystalline polyesters, poly(butylene naphthalenedicarboxylate) and poly(ethylene naphthalenedicarboxylate). A typical process for such is described in detail in U.S. Pat. No. 5,281,667, the disclosure of which is incorporated herein by reference.

Additional preferred polymer systems which may be employed in this invention include those which comprise polyphenylene ethers and polyarylene sulfides such as polyphenylene sulfide. Such polymer systems are prepared, for instance, by the reaction of epoxy functionalized polyphenylene ether compositions with polyphenylene sulfide containing epoxide-reactive functional groups. A detailed description of such preparation may be found in U.S. Pat. No. 5,122,578, the disclosure of which is incorporated herein by reference.

In a preferred embodiment of this invention, it may be desirable to add Group IIA or IIB sulfates as composition fillers, and barium sulfate is often preferred. In another preferred embodiment of the instant invention, it may be desirable to add aluminas and/or silicas to further enhance the hydrolytic stability of the compositions. Moreover, charring promoters may also be employed and they include, for example, melamines like melamine formaldehyde, and formaldehyde resins like phenol formaldehyde. Further, pigments/opacifiers like $TiO_2$ may also be used to color/fill the desired compositions, and it is within the scope of this invention to employ IR reflectors and char supporters.

There is essentially no limitation with respect to the method for producing the compositions of this invention. Often, however, the compositions are prepared by adding the members of (a) and (b) to (c) (polymer powders) followed by compounding in a melt reactor like a mixing extruder.

There is essentially no limitation with respect to the amount of coated additive added to the compositions of this invention. Often, no more than about 20% by weight and preferably no more than about 10% by weight and most preferably no more than about 5% by weight of the additive is added based on total weight of the composition.

When silicas and/or aluminas are added to the compositions, they often comprise less than 10% by weight and preferably less than about 5% by weight of the total weight of the composition.

In the instant invention, flame retardant properties are defined to mean that UL-94 is V-0, V-1 or V-2 at 1.6 mm or 3.2 mm in accordance with ASTM UL-94 specifications. Such properties are unexpectedly obtained when employing the hydrolytically stable additions described above and without requiring the use of environmentally unfriendly additives including halogenated compounds, red phosphorus and antimony oxides.

The following Example is provided to further illustrate and facilitate the understanding of the instant invention. All products may be confirmed via conventional techniques including proton and carbon-13 nuclear magnetic resonance spectroscopy, infrared spectroscopy and x-ray techniques.

Example 1

A flame retardant composition was prepared by mixing 42% polyphenylene ether, 46.3% Nylon 6,6, 0.7% citric acid (functionalizing agent), 2.0% polysiloxane (having a mixture of four components in a ratio of 2:3:2:1 depicted by formula I and below) (w=0; x, y, z=5; $R^1$=methyl groups; $R^2$=N-2-(aminoethyl)-3-aminopropyl group: w=0; x, y, z=5; $R^1$=methyl groups; $R^2$=methyl group: w=0; z=0; y=5; $R^1$=methyl groups; $R^2$=methyl groups; $R^3$=hydrogen: w=1; x, y, z=5; $R^1$=methyl groups; $R^2$=methyl group), 3.5% calcium coated boron phosphate, 3.5% $TiO_2$ and 2.0% of styrene (ethylene-butylene) styrene impact modifier to produce a mixture (all percentages are by weight based on total weight of the composition). The mixture was compounded in a twin screw extruder operating at barrel set temperatures of about 320° C. and a screw speed of about 300 rpm. The resulting polymer composition pellets were injection molded into 1.6 mm thick ASTM UL-94 bum test bars. Burn tests were conducted and the test bars had UL-94 ratings of V-0 at 4.0 seconds.

The data in the following table is provided to further demonstrate the unexpected and superior properties displayed by the compositions of this invention, including flame retardancy and increased hydrolytic stability. The compositions described in Examples 2–7 were prepared in a manner similar to the one described in Example 1, and the amount of polyamide employed varied in proportion to the amount of $BPO_4$ material added. The compositions described in Examples 8–13 were prepared in a manner similar to the one in Example 1 except that a polyphenylene ether (50% by weight), nylon, citric acid and polysiloxane premix was employed and no impact modifier was added.

TABLE

| Example | $BPO_4$%/Coated[a] | Flame Retardancy[b] | Hydrolytic stability[d] |
|---|---|---|---|
| 2 | 3.5/No | V-1 | — |
| 3 | 2.0/No | V-2 | — |
| 4 | 3.5/No | V-1 | — |
| 5 | 2.0/No | V-1 | — |
| 6 | 2.0/Yes | V-1 | — |
| 7 | 1.0/Yes | V-1 | — |
| 8 | 5%/No | V-1 | 26.74 |
| 9 | 5%/Yes | V-0 | 11.15[e] |
| 10 | 5%/Yes | HB[c] | 3.12 |
| 11 | 5%/Yes | V-2[c] | 3.87 |
| 12 | 5%/Yes | V-1 | 23.25 |
| 13 | 5%/Yes | V-1 | 27.78[e] |

[a]Examples 2 and 3 = uncoated $BPO_4$ powder; Examples 3 and 4 uncoated $BPO_4$ fine powder; Examples 6, 7, 9, 12 and 13 = monoatomic coating of calcium on $BPO_4$ core and Examples 10 and 11 = monoatomic coating of titanium on $BPO_4$ core.

[b]UL-94, ASTM standards, 1.6 mm.

[c]Examples 10 and 11 = different titanium lots, Example 10 = V-2 at 3.2 mm.

[d]Hydrolytic stability = % loss on hydrolysis as determined by boiling a known amount of material in deionized $H_2O$, drying residue and weighing the residue, wherein % loss is weight of soluble borate and phosphate ions.

[e]Examples 9 and 13 = different lots of monoatomic calcium coated $BPO_4$.

What is claimed is:

1. A composition comprising:

(a) an additive comprising a core and a metal ion coating wherein said core comprises boron phosphate and said metal ion coating comprises at least one metal selected from the members consisting of Group IIA, IIB, IVB, VIIB and VIII metals;

(b) polysiloxane; and (c) a polymer system comprising polyphenylene ether in combination with polyamide, polyolefin, polyarylene sulfide, polyester, acrylonitrile butadiene styrene copolymer, polystyrene or polyetherimide.

2. A composition in accordance with claim 1 wherein said metal is titanium, magnesium, calcium, barium, aluminum or zinc.

3. A composition in accordance with claim 1 wherein the coating has a thickness which is from about a monoatomic layer to about 1.5 microns.

4. A composition in accordance with claim 1 wherein said polysiloxane has the formula

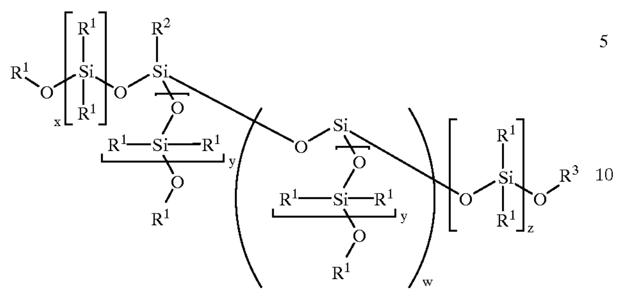

and each $R^1$ is independently a $C_{1-5}$ alkyl group and $R^2$ is a $C_{1-5}$ alkyl group or a N-(2-aminoalkyl)-3-aminoalkyl group, provided that $R^2$ is a N-2-(2-aminoalkyl)-3-aminoalkyl group when w is 0 and $R^3$ is hydrogen or a $C_{1-5}$ alkyl group and w is 0 or 2 and x and y are each independently an integer from 1 to 7 and z is an integer from 0 to 7.

5. A composition in accordance with claim 4 wherein $R^2$ is a methyl group or a N-(2-aminoethyl)-3-aminopropyl group.

6. A composition in accordance with claim 1 wherein said polymer system comprises polyphenylene ether and polyamide.

7. A composition in accordance with claim 1 wherein said polymer system comprises polycarbonate and polyester or terpolymer of acrylonitrile butadiene styrene.

8. A composition in accordance with claim 7 wherein said polycarbonate is a bisphenol A polycarbonate and said polyester is poly(butylene terephthalate).

9. A composition in accordance with claim 6 wherein said polyphenylene ether comprises 2,6-dimethyl-1,4-phenylene ether units and said polyamide is nylon 6/6.

10. A composition in accordance with claim 1 wherein said composition further comprises group II-A or II-B sulfate additives.

11. A composition in accordance with claim 10 wherein said group II-B sulfate additive is barrium sulfate.

12. A composition in accordance with claim 1 wherein said composition further comprises alumina or silica.

* * * * *